(12) United States Patent
Kim et al.

(10) Patent No.: US 8,450,027 B2
(45) Date of Patent: May 28, 2013

(54) FUEL CELL STACK OF FUEL CELL VEHICLE

(75) Inventors: Duck Whan Kim, Seoul (KR); Young Bum Kum, Seoul (KR); Young Woo Noh, Gyeonggi-do (KR); Sae Hoon Kim, Gyeonggi-do (KR); Kwi Seong Jeong, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 144 days.

(21) Appl. No.: 12/217,330

(22) Filed: Jul. 5, 2008

(65) Prior Publication Data

US 2009/0214928 A1 Aug. 27, 2009

(30) Foreign Application Priority Data

Feb. 22, 2008 (KR) .................. 10-2008-0016149

(51) Int. Cl.
*H01M 2/08* (2006.01)
*H01M 2/14* (2006.01)

(52) U.S. Cl.
USPC .................. 429/507; 29/623.1; 429/508

(58) Field of Classification Search
USPC ........................................ 429/12, 34
See application file for complete search history.

(56) References Cited

U.S. PATENT DOCUMENTS

| 5,993,987 | A | 11/1999 | Wozniczka et al. | |
|---|---|---|---|---|
| 6,218,039 | B1 * | 4/2001 | Mease et al. | 429/37 |
| 7,063,912 | B2 * | 6/2006 | Vuk et al. | 429/38 |
| 2006/0051651 | A1 * | 3/2006 | Rock et al. | 429/34 |

FOREIGN PATENT DOCUMENTS

| JP | 2000-048850 | 2/2000 |
|---|---|---|
| JP | 2004-185845 | 7/2004 |
| JP | 2007-220331 | 8/2007 |

* cited by examiner

*Primary Examiner* — Kaj K Olsen
*Assistant Examiner* — Ross J Christie
(74) *Attorney, Agent, or Firm* — Edwards Wildman Palmer LLP; Peter F. Corless; Kongsik Kim (57) ABSTRACT

The present invention provides a method of assembling a fuel cell stack, in which a fixing block and a fixing pin are used to assemble the fuel cell stack instead of a bolt, thereby reducing the time and process required for assembly of the fuel cell stack, enabling an assembly process using an automated device to be realized, and facilitating mass production.

14 Claims, 14 Drawing Sheets

FUEL CELL STACK OF FUEL CELL VEHICLE

CROSS-REFERENCE TO RELATED APPLICATION

This application claims under 35 U.S.C. §119(a) the benefit of Korean Patent Application No. 10-2008-0016149 filed Feb. 22, 2008, the entire contents of which are incorporated herein by reference.

BACKGROUND (a) Technical Field

The present invention relates to a method for assembling a fuel cell stack of a fuel cell vehicle by using a fixing block and a fixing pin and a fuel cell stack therefrom, which can reduce the time and process required for assembling the fuel cell stack and facilitate mass production.

(b) Background Art

A fuel cell system generates electricity by electrochemically converting chemical energy into electric energy rather than converting the chemical energy into heat via combustion.

The fuel cell system typically comprises the fuel cell stack for generating electricity, a hydrogen supply system for supplying hydrogen as a fuel to the fuel cell stack, an air (oxygen) supply system for supplying oxygen in the air, which is an oxidizing agent required for an electrochemical reaction, to the fuel cell stack, and a thermal management system (TMS) for removing reaction heat of the fuel cell stack to the outside of the fuel cell system, controlling the operation temperature of the fuel cell stack, and performing water management function.

In the above-described fuel cell system, the fuel cell stack is a device that generates electricity by reacting hydrogen as a fuel and oxygen in the air.

Figure 10:
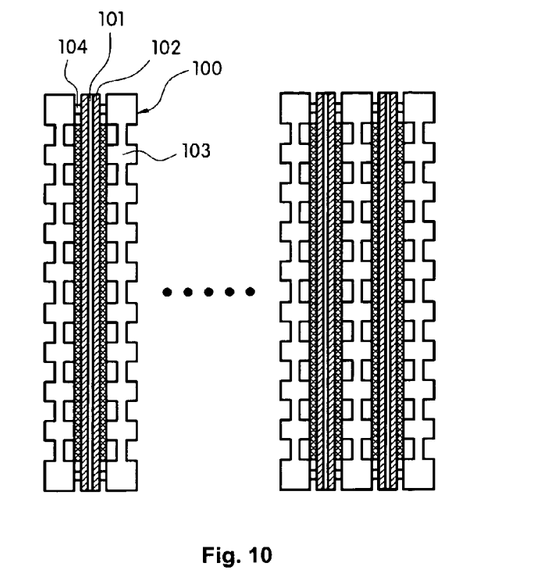
FIG. 10 is a cross-sectional view showing a unit cell of a conventional fuel cell stack.

As shown in FIG. 10, a unit cell 100 of the fuel cell stack includes a membrane electrode assembly 101 (MEA), a gas diffusion layer 102 (GDL), a separator 103, and a gasket 104 for maintaining airtightness. The unit cell generates electricity by a chemical reaction represented by the following formula 1:

[Formula 1]

Through the above reaction, the unit cell 100 generates electricity ranging from 0.6 to 1.0V, about 0.7V on the average.

Since the fuel cell stack for a vehicle requires a high power, at least about 400 unit cells are piled together in a fuel cell stack to obtain a desired voltage.

Figure 11:
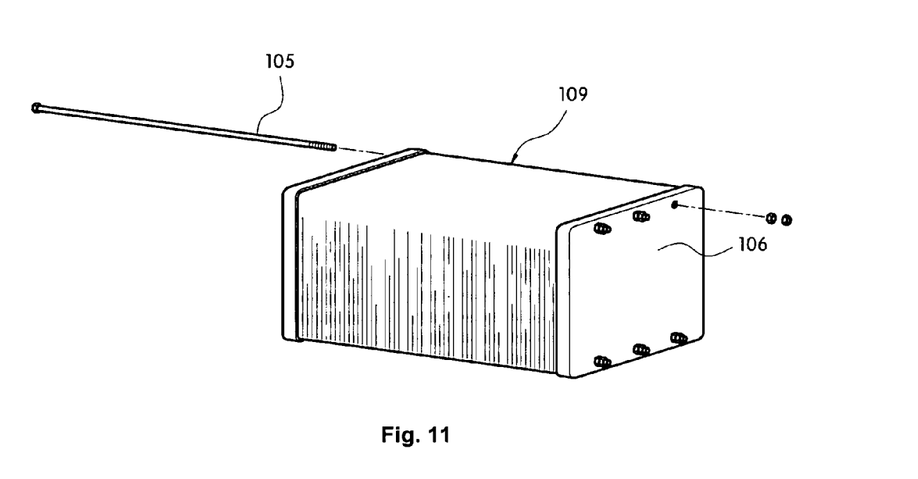
FIG. 11 is a perspective view showing an example of a conventional fuel cell stack assembly structure.
Figure 12:
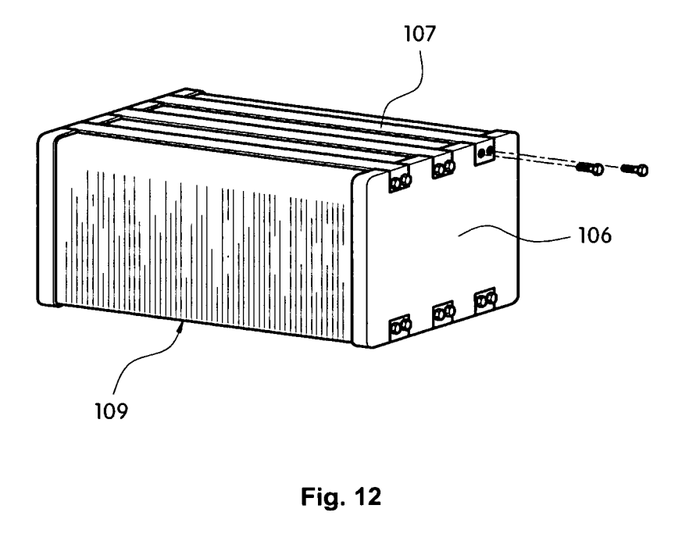
FIG. 12 is a perspective view showing another example of a conventional fuel cell stack assembly structure.
Figure 13:
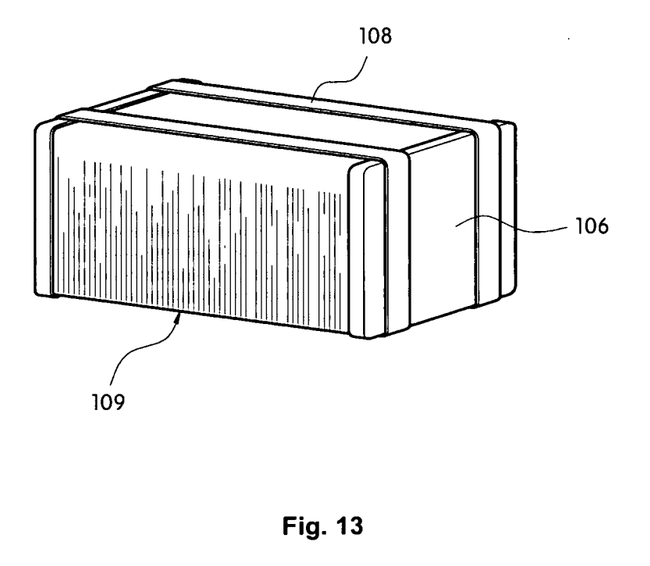
FIG. 13 is a perspective view showing still another example of a conventional fuel cell stack assembly structure.

Conventionally, the unit cells are stacked in series in the fuel cell stack by, for example, fixing end plates 106, positioned on both ends of stacked cells, using a long bolt 105 as shown in FIG. 11, fixing end plates 106 by bolting a fastening bar 107 or a fastening plate thereto as shown in FIG. 12, or putting a fastening bar 108 around the whole circumference of the fuel cell stack as shown in FIG. 13.

In particular, U.S. Pat. Nos. 6,455,179 and 4,345,009, Japanese Patent No. 2004-0065492 disclose methods of assembling a fuel cell stack using a long bolt and a nut. However, the methods are time-consuming, especially with respect to the bolt connection and thus is not suitable for automated process.

Also, Japanese Patent Nos. 2006-54067, 2006-66256, 2006-73226, and 2006-73459 disclose methods of assembling end plates to a fuel cell stack by inserting a pin into a tab provided on the end plates and the bottom, top and side plates. However, the methods have a drawback in that the pins may be escaped from their own position by vibration or shock.

Additionally, U.S. Pat. No. 6,645,659 discloses a method of assembling a fuel cell stack by coupling end plates to a tension plate by a serration and a bolt. However, the method is time-consuming in bolting process.

In addition, U.S. Pat. No. 5,789,901 discloses a method of assembling a fuel cell stack using a fastening band and a disc spring. However, the method requires a high pressure device since it involves a high load during fastening process. In a case where the whole fuel cell stack is wrapped by a fastening band, this method is not feasible.

The conventional methods use a great number of bolts during assembly, a lot of time is taken to perform the bolting process and a number of processes are required. As a result, the methods are disadvantageous for mass production.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention has been made in an effort to solve the above-described problems associated with prior art.

In one aspect, the present invention provides a fuel cell stack of a fuel cell vehicle, including a plurality of unit cells and end plates disposed on each of both ends thereof, the fuel cell stack comprising: a fastening bar between the end plates, which fastening bar contacts a top portion and a side portion of each of the end plates; a fixing block penetrating an end portion of the fastening bar, connected to the end plate in a predetermined direction, and having a head portion which supports the fastening bar; and a fixing pin penetrating the fastening bar at an angle perpendicular to the predetermined direction and detachably connected to the fixing block.

In another aspect, the present invention provides a method of assembling a fuel cell stack for a fuel cell vehicle, which includes a plurality of unit cells and end plates disposed on each of both ends thereof, the method comprising: disposing a fastening bar between the end plates such that the fastening bar contacts a top portion and a side portion of each of the end plates; allowing a fixing block to penetrate an end of the fastening bar in a predetermined direction to insert the fixing block into each of the end plates; allowing a fixing pin to penetrate the fastening bar at an angle perpendicular to the predetermined direction to connect the fixing pin to the fixing block.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like.

The above and other features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinafter by way of illustration only, and thus are not limitative of the present invention, and wherein.

Reference numerals set forth in the Drawings includes reference to the following elements as further discussed below:

| | |
|---|---|
| 10: head portion | 11: fixing block |
| 12: fixing pin | 13: stopper |
| 14: groove | 15: locking groove |
| 16: locking projection | 17: key |
| 18: concave-convex portion | 19: slot |
| 20: ball | 21: groove portion |
| 22: spring | 23: tool insertion groove |
| 24: block body | 25: set screw |
| 26: recess portion | 27: U-shaped groove |
| 28: ball spring | 106: end plate |
| 107 fastening bar | 109: unit module |

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to the preferred embodiments of the present invention, examples of which are illustrated in the drawings attached hereinafter, wherein like reference numerals refer to like elements throughout. The embodiments are described below so as to explain the present invention by referring to the figures.

Figure 1:
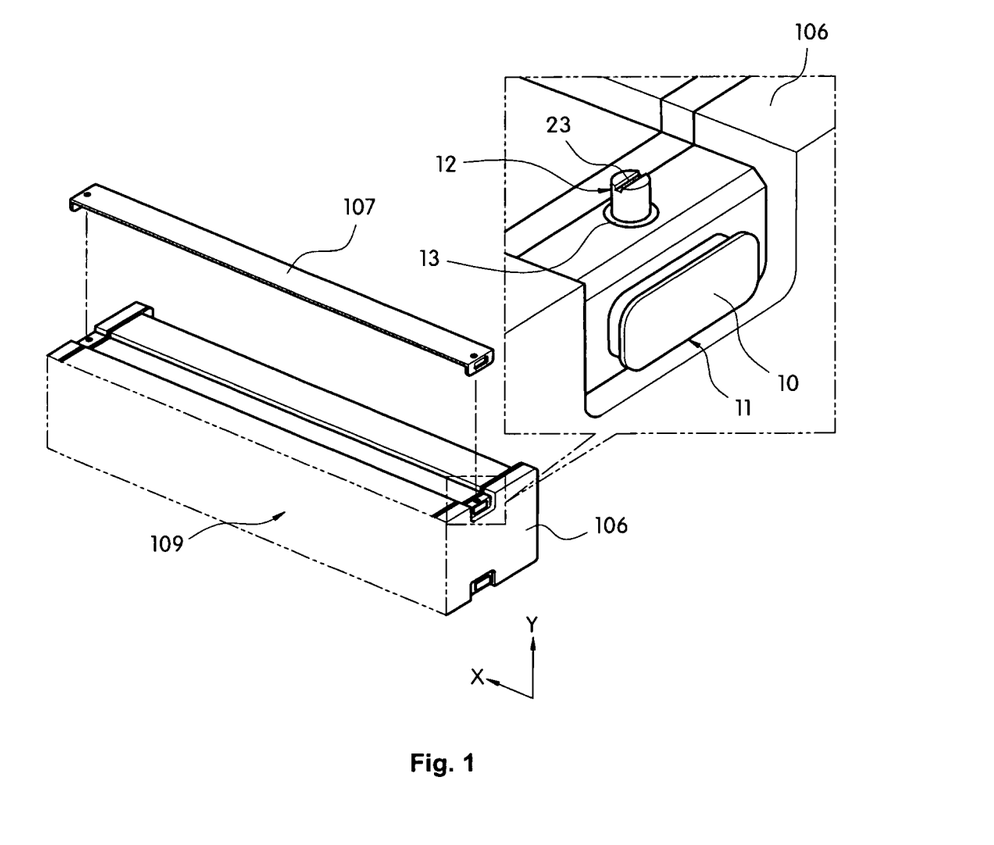
FIG. 1 is a perspective view showing a fuel cell stack assembly structure in accordance with a first preferred embodiment of the present invention.
Figure 2:
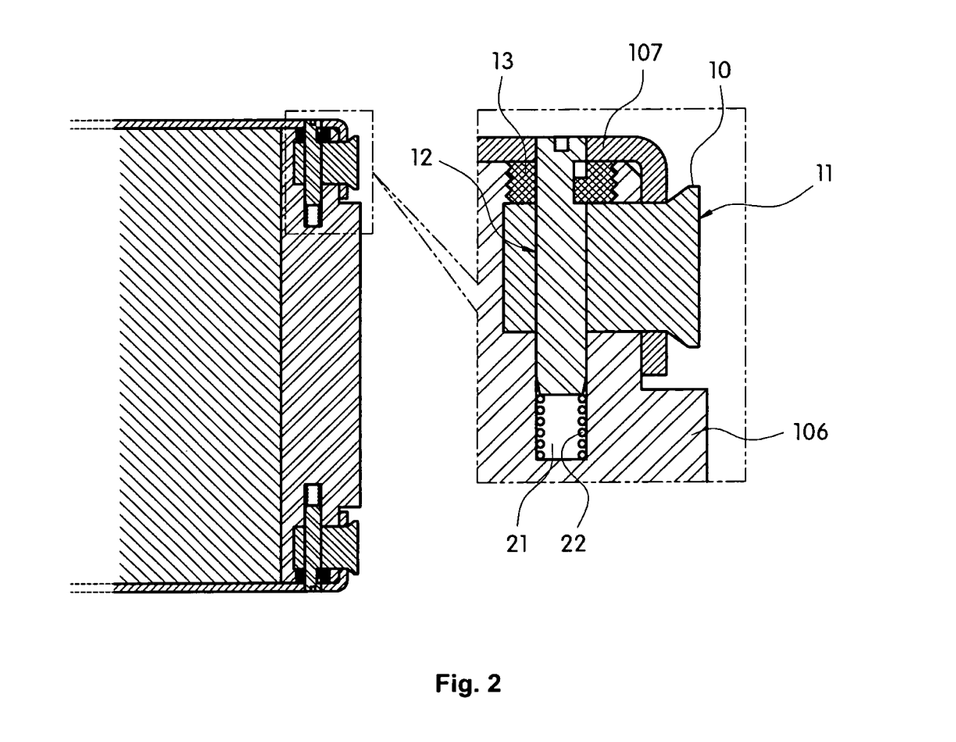
FIG. 2 is a cross-sectional view showing the fuel cell stack assembly structure in accordance with the first preferred embodiment of the present invention.

FIGS. 1 and 2 are a perspective view and a cross-sectional view showing a fuel cell stack assembly structure in accordance with a first preferred embodiment of the present invention.

Each of end plates 106 is disposed on each end of a unit module 109 in which several hundred unit cells are stacked. A plurality of fastening bars 107 are disposed between the end plates 106. A fixing block 11 and a fixing pin 12 are inserted into each of the fasting bars 107 to assemble a fuel cell stack.

With the use of the fixing block 11 and the fixing pin 12, the assembly and disassembly processes are simplified and the time for assembly and disassembly are significantly reduced, compared with the conventional methods using bolt connection.

The assembly method using the fixing block 11 and the fixing pin 12 will be described in more detail below.

First, the fastening bar 107 for holding the end plates 106 on both sides is disposed between the end plates 106.

In a state where the end portions of the fastening bar 107 are put on the outside surface of the end plates 106, the fixing block 11 penetrates the fastening bar 107 in a predetermined direction, e.g., in an X direction, and the fixing pin 12 penetrates the fastening bar 107 in a predetermined direction, e.g., in a Y direction, to assemble the end plates 106.

That is, the fixing block 11 penetrates the fastening bar 107 and is then connected to the end plate 106 while a head portion 10 thereof presses down the outside surface of the fastening bar 107. The fixing pin 12 penetrates the fastening bar 107 in a position adjacent to the connection region of the fixing block 11 at an angle perpendicular to the connection direction of the fixing block 11 and is then inserted to a portion of the fixing block 11.

The end portion of the fixing pin 12, after being inserted into the fixing block 11, may extend a little bit more to be positioned in a groove portion 21 formed on the end plate 106.

Here, the fixing block 11 may be fixed by pressing down the fastening bar 107 using the head portion 10 during assembly, and the head portion 10 may be formed in various shapes such as a wedge shape, a rectangular shape, and the like.

The fixing block 11 includes a rectangular block body 24 and the head portion 10 having an area greater than that of the block body 24. The fixing block 11 may be formed into a whole block or a part thereof such as a half block cut in the vertical direction along the center line of the width. The whole block and the part block are same in their function.

The bock body 24 includes therein the insertion portion of the fixing block 11. The shape of the block body 24 is not limited. It may be an oval, a circle, and the like.

Figure 3A:
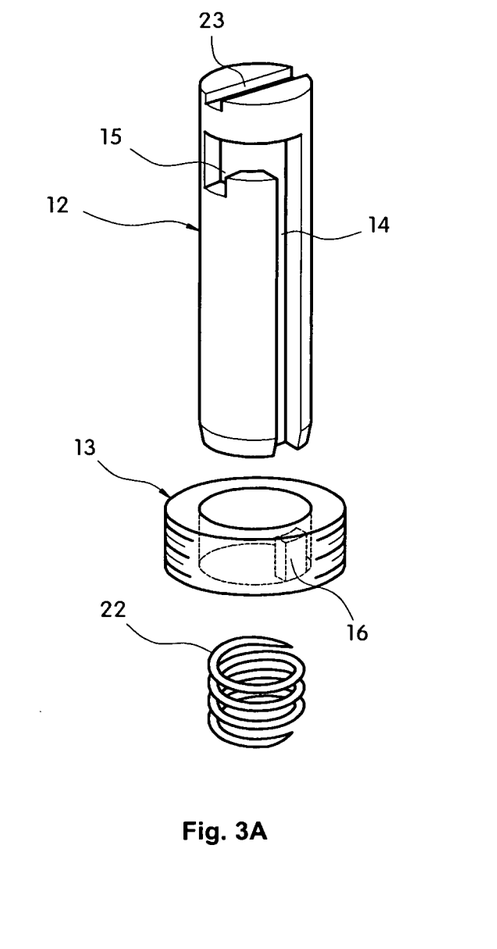
FIGS. 3A and 3B are perspective views showing a fixing pin assembly in the fuel cell stack assembly structure in accordance with the first preferred embodiment of the present invention.
Figure 3B:
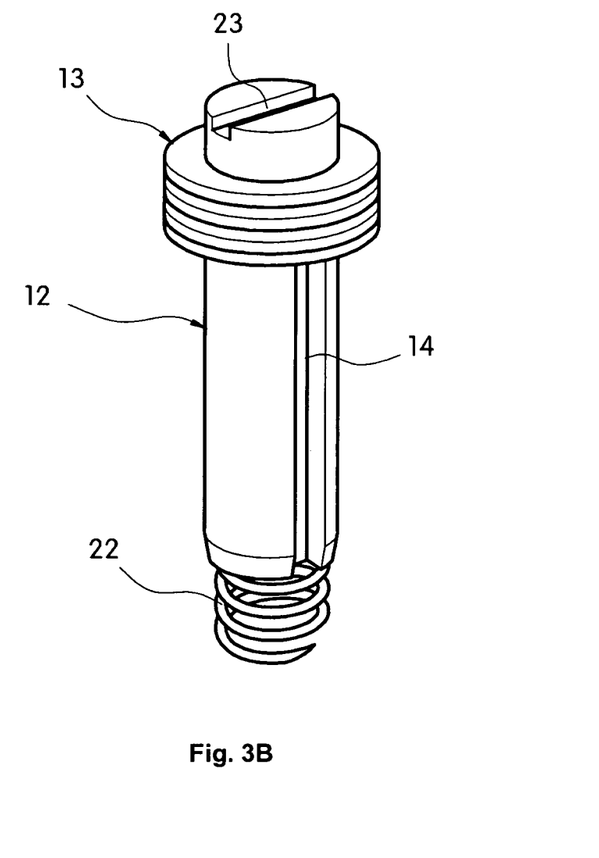

FIGS. 3A and 3B are perspective views showing a fixing pin assembly in the fuel cell stack assembly structure in accordance with the first preferred embodiment of the present invention.

The end plate 106 includes a locking projection 16 for locking the fixing pin 12 penetrating the end plate 106. Preferably, the locking projection 16 may be directly provided on the end plate 106. Also preferably, a ring-shaped stopper 13 including the locking projection 16 may be provided on the end plate 106. In this case, the fixing pin 12 passes through the stopper 13 to be connected to the fixing block 11 while being able to be locked and released to and from the stopper 13 by a rotation operation.

For this, the fixing pin 12 includes a groove 14 extending from one end thereof along a longitudinal direction, and the groove 14 includes a locking notch 15 connected to the groove 14 and extending in a circumferential direction.

Accordingly, during assembly, the fixing pin 12 is inserted into the groove 14 by being guided by the locking projection 16 and, if the fixing pin 12 is rotated at the end portion at a predetermined angle, for example, 90°, the locking projection 16 is accommodated in the locking notch 15. As a result, the connection state of the fixing pin 12 is maintained by the locking operation.

A tool insertion groove 23 may be formed on the head surface of the fixing pin 12 such that a tool such as a screw-driver is inserted thereinto to facilitate the connecting or releasing operation of the fixing pin 12.

Preferably, a force of a spring 22 may be used with respect to the connection and release of the fixing pin 12. For example, the end portion of the fixing pin 12 is supported by the spring 22 such that the connection state of the fixing pin 12 is firmly maintained by appropriately using the force of the spring 22, and the fixing pin 12 gets easily removed therefrom by releasing the locking state of the fixing pin 12. In particular, the spring 22 is mounted in the groove portion 21 formed on the end plate 106 to elastically support the end portion of the fixing pin 12.

Accordingly, in a state where the connection operation is completed, the locking projection 16 is firmly locked in the locking notch 15 of the fixing pin 12 by the pressing force of the spring 22, and thus the fixing pin 12 is not removed therefrom of itself. That is, since the fixing pin 12 receives the pressing force of the spring 22 exerted outward continuously, it is not removed therefrom by vibration or shock. During release, when the fixing pin 12 being slightly pressed is rotated about 90° in the circumferential direction (in the reverse direction during assembly), since the locking state is released and the fixing pin 12 slightly projects, it is possible to easily extract the fixing pin 12.

Figure 4:
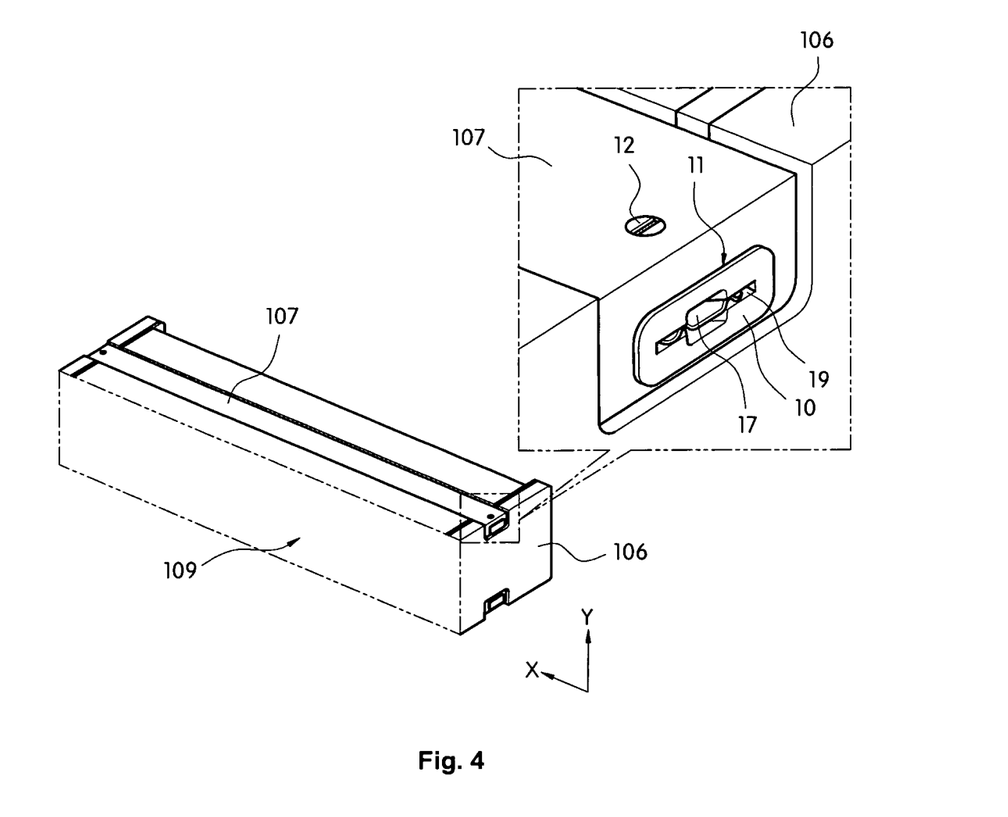
FIG. 4 is a perspective view showing a fuel cell stack assembly structure in accordance with a second preferred embodiment of the present invention.
Figure 5:
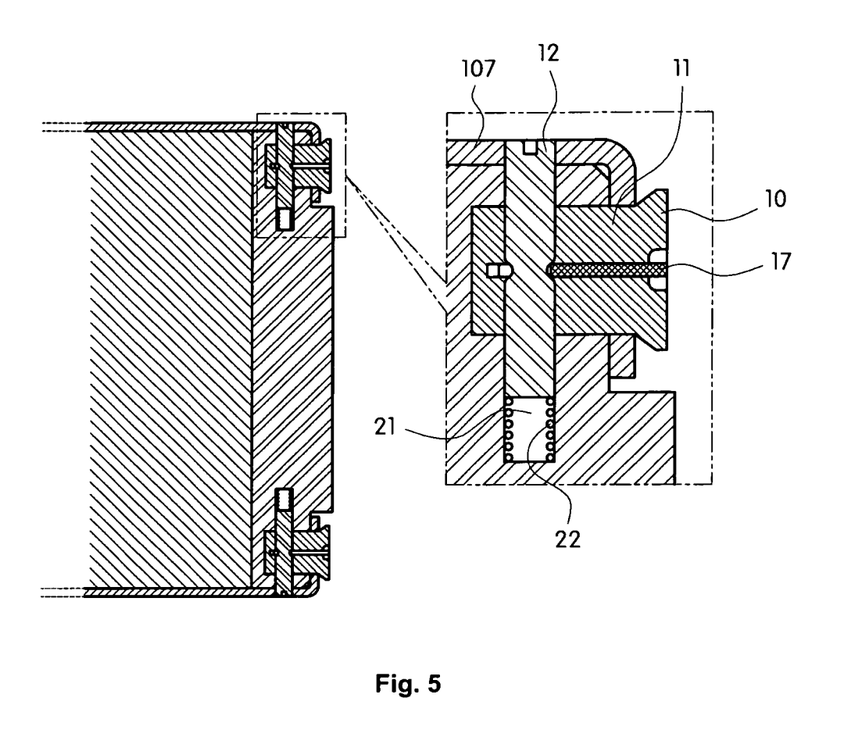
FIG. 5 is a cross-sectional view showing the fuel cell stack assembly structure in accordance with the second preferred embodiment of the present invention.

FIGS. 4 and 5 are a perspective view and a cross-sectional view showing a fuel cell stack assembly structure in accordance with a second preferred embodiment of the present invention.

As shown in FIGS. 4 and 5, the process of connecting a fixing block 11 and a fixing pin 12 to a fastening bar 107 disposed between end plates 106 is the same as or similar to that of the above-described preferred embodiment.

That is, the fixing block 11 penetrates the fastening bar 107 and is then connected to the end plate 106 while a head portion 10 thereof presses down the outside surface of the fastening bar 107. The fixing pin 12 penetrates the fastening bar 107 in a position adjacent to the connection region of the fixing block 11 at an angle perpendicular to the connection direction of the fixing block 11 and is then connected to the fixing block 11.

However, this embodiment is different from the first embodiment in terms of detachable structure of the fixing pin 12.

Figure 6A:
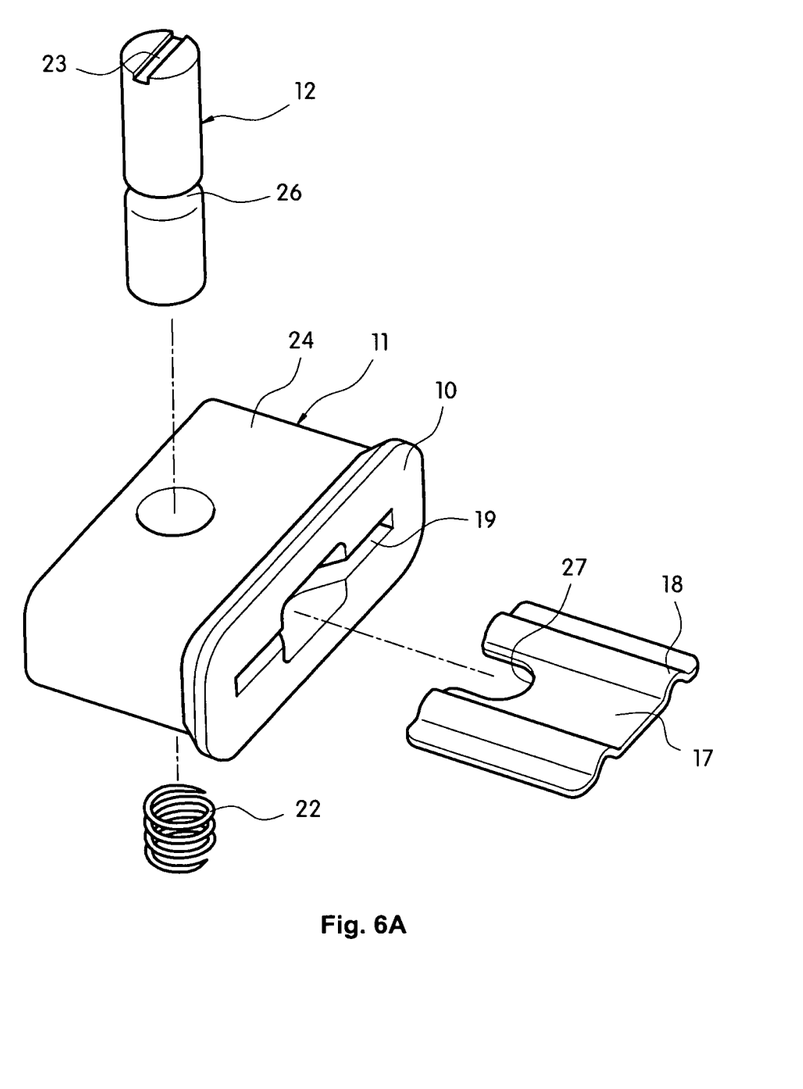
FIGS. 6A and 6B are perspective views showing a fixing pin assembly in the fuel cell stack assembly structure in accordance with the second preferred embodiment of the present invention.
Figure 6B:
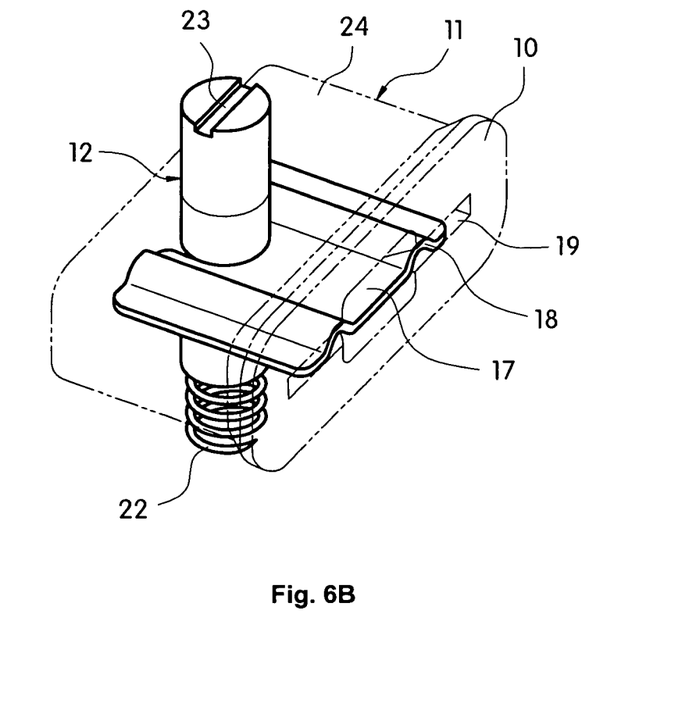

Particularly, as shown in FIGS. 6A and 6B, the fixing pin 12 is connected on the fixing block 11 while being able to be locked and released by a key 17 capable of locking the fixing pin 12. The key 17 is formed into a plate shape having a concave-convex portion 18 formed on both sides thereof. Moreover, the key 17 has a U-shaped groove 27, formed on one end thereof, to which the fixing pin 12 is locked and fixed.

The key 17 is inserted into a slot 19 provided in the fixing block 11. In particular, the fixing block 11 includes a linear slot 19 recessed from the front surface of the head portion 10 to the inside of a block body 24. The key 17 can be inserted along the thus formed slot 19.

After being inserted, the concave-convex portions 18 of the key 17 are closely adhered to the wall surface of the slot 19, and thus it is not easily removed therefrom by vibration or shock.

In this case, since the middle portion of the slot 19 is widened, the key 17 may be easily removed therefrom using a tool during removal.

That is, when the fixing pin 12 having a recess portion 26 formed in the middle thereof is inserted into the block body 24 of the fixing block 11 and then the key 17 is completely inserted into the slot 19 in the perpendicular direction, the U-shaped groove 27 of the key 17 is locked to the recess portion 26 of the fixing pin 12, thus firmly connecting the fixing pin 12 to the fixing body 11.

During disassembly of the module, the fixing pin 12 may be removed therefrom after extracting the key 17 using a tool. In this case, it is of course possible to use elastic force of a spring 22 for removal of the fixing pin 12.

Figure 7:
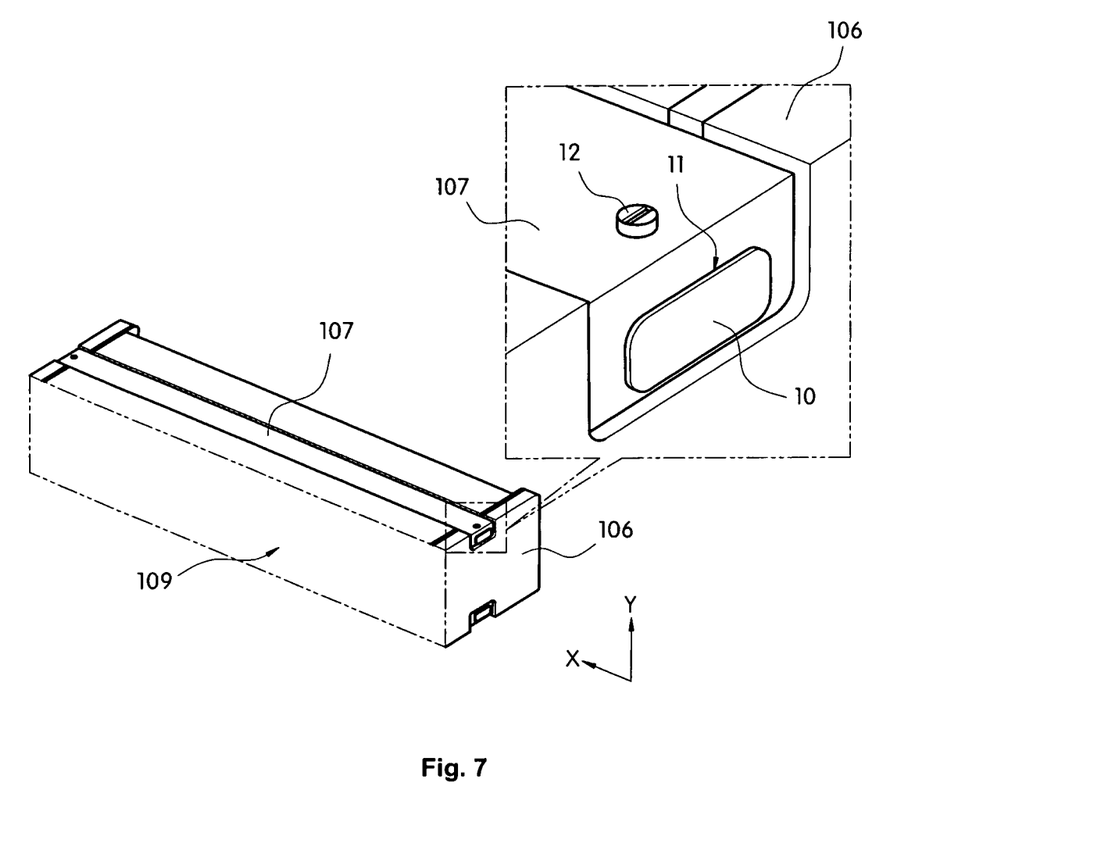
FIG. 7 is a perspective view showing a fuel cell stack assembly structure in accordance with a third preferred embodiment of the present invention.
Figure 8:
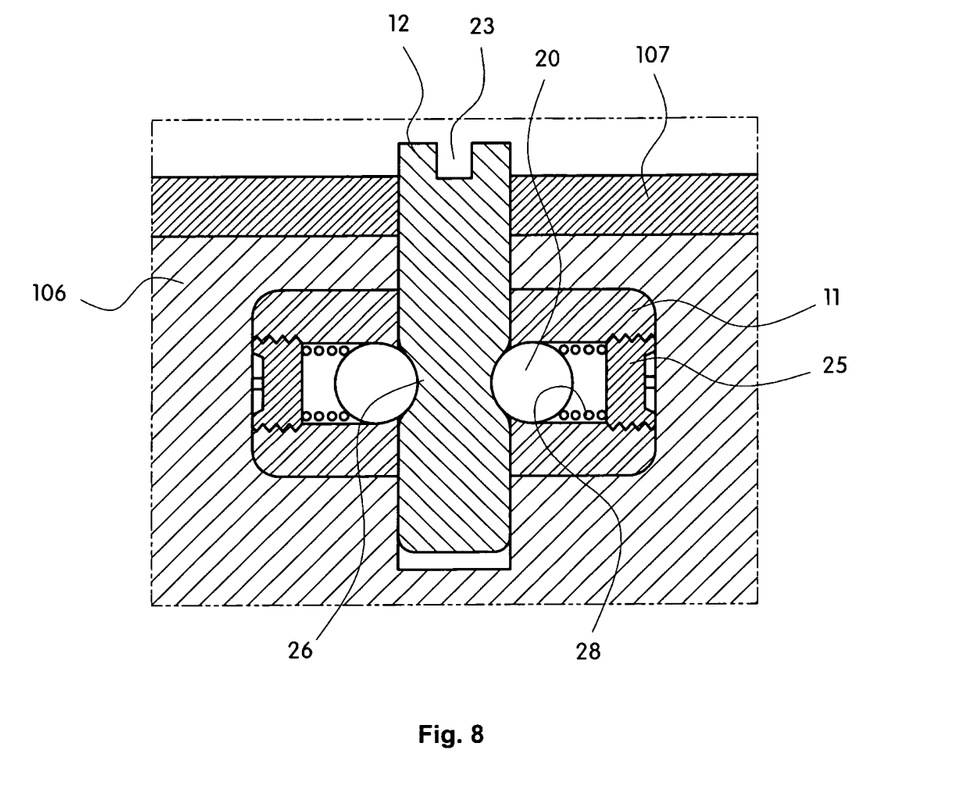
FIG. 8 is a cross-sectional view showing the fuel cell stack assembly structure in accordance with the third preferred embodiment of the present invention.

FIGS. 7 and 8 are a perspective view and a cross-sectional view showing a fuel cell stack assembly structure in accordance with a third preferred embodiment of the present invention.

As shown in FIGS. 7 and 8, the process of connecting a fixing block 11 and a fixing pin 12 to a fastening bar 107 disposed between end plates 106 on both sides is the same as or similar to the above-described two preferred embodiments That is, the fixing block 11 penetrates the fastening bar 107 and is then connected to the end plate 106 while a head portion 10 thereof presses down the outside surface of the fastening bar 107. Subsequently, the fixing pin 12 penetrates the fastening bar 107 at an angle perpendicular to the connection direction of the fixing block 11 and is then connected to the fixing block 11.

However, this embodiment is different from the above-described embodiments in terms of detachable structure of the fixing pin 12.

Figure 9A:
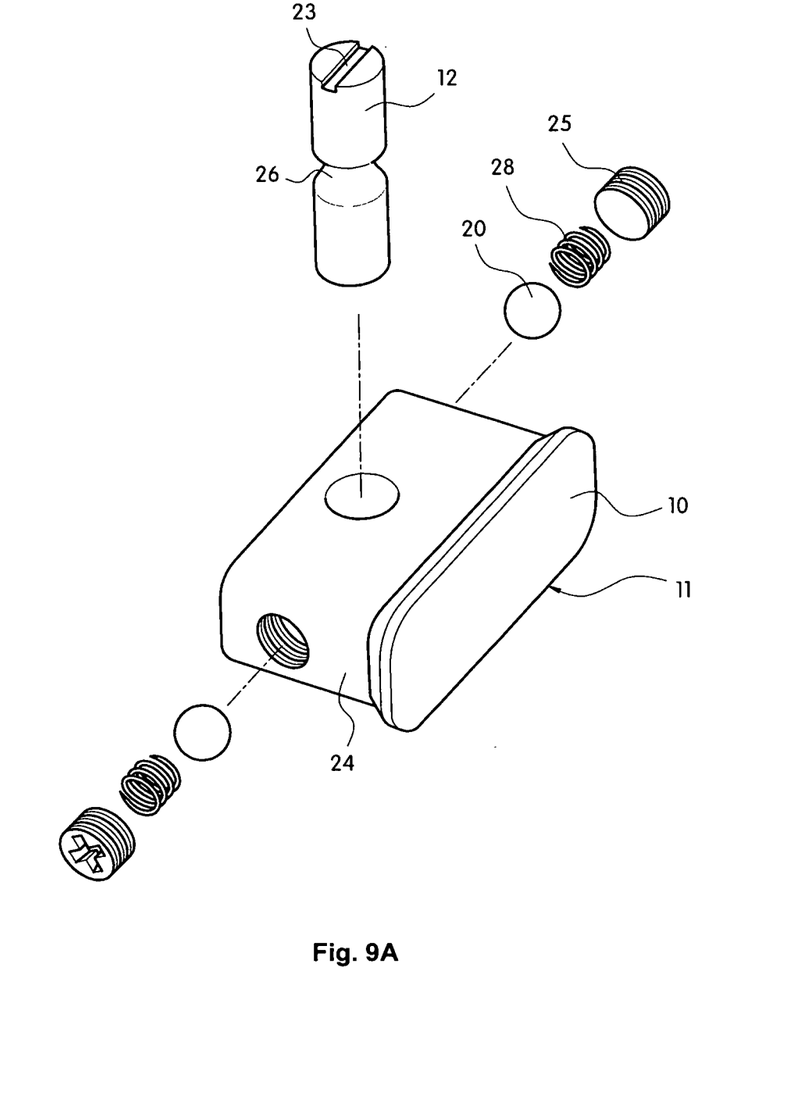
FIGS. 9A and 9B are perspective views showing a fixing pin assembly in the fuel cell stack assembly structure in accordance with the third preferred embodiment of the present invention.
Figure 9B:
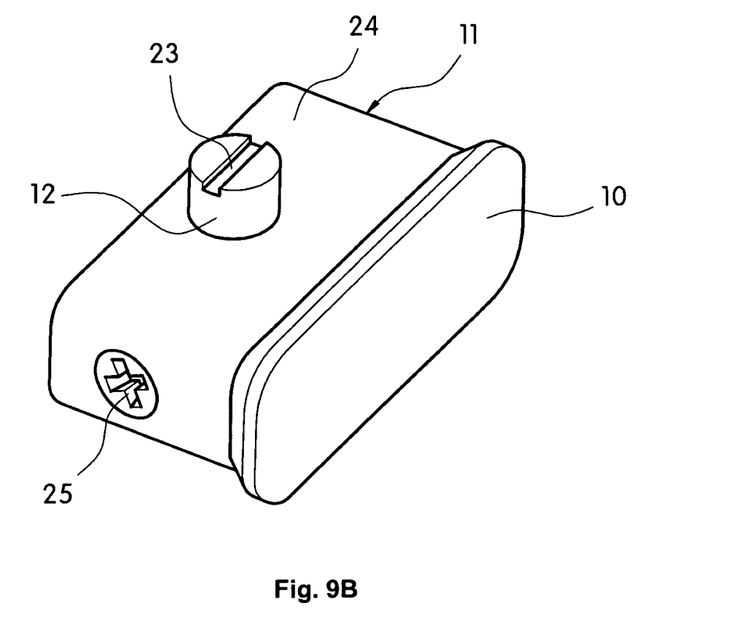

In particular, as shown in FIGS. 9A and 9B, a ball 20 is provided on both sides of the fixing pin 12 to maintain the connection state of the fixing pin 12.

The ball 20 is inserted into a hole formed on a lateral surface of a fixing body 24 of the fixing block 11, a ball spring 28 is disposed at the rear thereof, and a set screw 25 is coupled to the block body 24, thus completing the connection.

The ball 20 receives elastic force of the ball spring 28 disposed at the rear thereof to press the fixing pin 12 positioned in front thereof, and the ball 20 is prevented from being removed therefrom by a projection provided on the end of the hole.

That is, when the fixing pin 12 having the recess portion 26 formed in the middle thereof is inserted into the block body 24 of the fixing block 11, the balls 20 are in close contact with both sides of the recess portion 26 of the fixing pin 12, and thus the fixing pin 12 may not be removed therefrom.

In this case, it is possible to adjust the fixing force exerted to the fixing pin 12 by appropriately adjusting the elastic force of the ball spring 28 supporting the ball 20.

During disassembly of the module, the fixing pin 12 may be forcibly extracted therefrom using a tool.

Like this, the method of assembling the fuel cell stack provided by the present invention is to use the fixing block and the fixing pin, in which the end plates placed on both ends of the unit module, in which unit cells are stacked, are connected by the fastening bar, the fastening bar is fixed by the fixing block instead of the bolt, and the fixing block is fixed by the fixing pin so as not to be removed therefrom.

As described above, the method of assembling the fuel cell stack in accordance with the present invention provides many advantages including the following. First, the time and process required for the assembly of the fuel cell stack can be reduced. For example, it takes about 10 to 30 minutes to assemble the module manually; by contrast, it takes only 1 to 5 minutes to assemble using the present method. Second, since the present method does not require a post process necessary for the bolting process, manufacturing costs can be reduced. Third, the disassembly process is as simple as the assembly process. Lastly, an assembly process using an automated device is available to achieve mass production.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A fuel cell stack of a fuel cell vehicle, which includes a plurality of unit cells and an end plate disposed on each of both ends thereof, the fuel cell stack comprising;
   a fastening bar between the end plates, which fastening bar contacts a top portion and a side portion of each of the end plates;
   a fixing block penetrating an end portion of the fastening bar, connected to the end plate in a predetermined direction, and having a head portion which supports the fastening bar by pressing down an outside surface of the fastening bar in a direction from one end elate to an opposite end plate using the head portion; and
   a fixing pin penetrating the fastening bar at an angle perpendicular to the predetermined direction and detachably connected to the fixing block,
   wherein the detachable connection of the fixing pin to the fixing block is realized by allowing the fixing pin to be locked to and released from a locking projection provided directly or indirectly on the end plate by rotation of the fixing pin.

2. The fuel cell stack of claim 1 wherein the fixing pin comprises a spring positioned in a groove portion on the end plate for providing elastic force to the fixing pin.

3. The fuel cell stack of claim 1, wherein the fixing pin comprises a groove formed in a longitudinal direction thereof and a locking notch arranged in parallel to the groove, wherein one end of the groove is communicated with the locking notch such that the locking projection traveling along the groove can be introduced into the locking notch by rotating the fixing pin when the locking projection reaches the one end of the groove.

4. The fuel cell stack of claim 1, wherein the detachable connection of the fixing pin to the fixing block is realized by allowing the fixing pin to be locked to and released from the fixing block by a key to be inserted and removed from a slot formed in the fixing block.

5. The fuel cell stack of claim 4, wherein the key is formed into a plate shape having at least one concave-convex portion.

6. The fuel cell stack of claim 4, wherein the fixing pin comprises a spring positioned in a groove portion on the end plate for providing elastic force to the fixing pin.

7. The fuel cell stack of claim 1, wherein the detachable connection of the fixing pin to the fixing block is realized by allowing the fixing pin to be locked to and released from a ball provided in the fixing block.

8. A method of assembling a fuel cell stack for a fuel cell vehicle, which includes a plurality of unit cells and end plates disposed on each of both ends thereof, the method comprising:
   disposing a fastening bar between the end plates such that the fastening bar contacts at least a top portion and a side portion of each of the end plates;
   penetrating, by a fixing block, an end of the fastening bar in a predetermined direction to insert the fixing block into each of the end plates wherein a head portion of the fixing block supports the fastening bar by pressing down an outside surface of the fastening bar in a direction from one end plate to an opposite end plate using the head portion; and
   allowing a fixing pin to penetrate the fastening bar at an angle perpendicular to the predetermined direction to connect the fixing pin to the fixing block,
   wherein the detachable connection of the fixing pin to the fixing block is realized by allowing the fixing pin to be locked to and released from a locking projection provided directly or indirectly on the endplate by rotation of the fixing pin.

9. A fuel cell stack of a fuel cell vehicle, which includes a plurality of unit cells and an end plate disposed on each of both ends thereof, the fuel cell stack comprising:
   a fastening bar between the end plates, which fastening bar contacts a top portion and a side portion of each of the end plates;
   a fixing block penetrating an end portion of the fastening bar, connected to the end plate in a predetermined direction, and having a head portion which supports the fastening bar by pressing down an outside surface of the fastening bar in a direction from one end plate to an opposite end plate using the head portion; and
   a fixing pin penetrating the fastening bar at an angle perpendicular to the predetermined direction and detachably connected to the fixing block,
   wherein the detachable connection of the fixing pin to the fixing block is realized by allowing the fixing pin to be locked to and released from a locking projection provided directly or indirectly on the end plate by rotation of the fixing pin, and
   the fixing pin comprises a spring positioned in a groove portion on the end plate for providing elastic force to the fixing pin.

10. A fuel cell stack of a fuel cell vehicle, which includes a plurality of unit cells and an end plate disposed on each of both ends thereof, the fuel cell stack comprising:
   a fastening bar between the end plates, which fastening bar contacts a top portion and a side portion of each of the end plates;
   a fixing block penetrating an end portion of the fastening bar, connected to the end plate in a predetermined direction, and having a head portion which supports the fastening bar by pressing down an outside surface of the fastening bar in a direction from one end plate to an opposite end plate using the head portion; and
   a fixing pin penetrating the fastening bar at an angle perpendicular to the predetermined direction and detachably connected to the fixing block,
   wherein:
   a) the detachable connection of the fixing pin to the fixing block is realized by allowing the fixing pin to be locked to and released from a locking projection provided directly or indirectly on the end plate by rotation of the fixing pin,
   b) the fixing pin comprises;

(i) a spring positioned in a groove portion on the end plate for providing elastic force to the fixing pin; and (ii) a groove formed in a longitudinal direction thereof and a locking notch arranged in parallel to the groove, wherein one end of the groove is communicated with the locking notch such that the locking projection traveling along the groove can be introduced into the locking notch by rotating the fixing pin when the locking projection reaches the one end of the groove;

c) the detachable connection of the fixing pin to the fixing block is realized by allowing the fixing pin to be locked to and released from the fixing block by a key to be inserted and removed from a slot formed in the fixing block, and the key is formed into a plate shape having at least one concave-convex portion.

11. The fuel cell stack of claim 10 wherein the detachable connection of the fixing pin to the fixing block is realized by allowing the fixing pin to be locked to and released from a ball provided in the fixing block.

12. A vehicle comprising a fuel cell of claim 1.

13. A vehicle comprising a fuel cell of claim 9.

14. A vehicle comprising a fuel cell of claim 10.

\* \* \* \* \*